(12) United States Patent
Denton

(10) Patent No.: US 6,938,963 B2
(45) Date of Patent: Sep. 6, 2005

(54) VENTING PLUG FOR VEHICLE HUB CAP

(75) Inventor: Kacy D. Denton, Clover, SC (US)

(73) Assignee: SFK USA Inc., Elgin, IL (US)

( * ) Notice: Subject to any disclaimer, the term of this patent is extended or adjusted under 35 U.S.C. 154(b) by 0 days.

(21) Appl. No.: 10/673,018

(22) Filed: Sep. 22, 2003

(65) Prior Publication Data

US 2005/0062340 A1 Mar. 24, 2005

(51) Int. Cl.$^7$ .................................................. B60B 7/00
(52) U.S. Cl. .................................. 301/108.1; 301/108.4
(58) Field of Search .......................... 301/37.26, 37.28, 301/108.1–108.4

(56) References Cited

U.S. PATENT DOCUMENTS

| 3,064,982 A | 11/1962 | Stephens |
| 3,114,579 A | 12/1963 | Isenbarger |
| 3,177,041 A * | 4/1965 | Isenbarger ............... 301/108.2 |
| 3,316,022 A | 4/1967 | Isenbarger |
| 3,331,638 A | 7/1967 | Fruth |
| 3,395,950 A | 8/1968 | Brandt |
| 4,084,039 A | 4/1978 | Laig-Horstebrock |
| 4,181,145 A | 1/1980 | Mitchell |
| 4,834,464 A | 5/1989 | Frehse |
| 5,192,117 A | 3/1993 | Kuck |
| 5,482,358 A | 1/1996 | Kuck |
| 5,492,393 A | 2/1996 | Peisker et al. |
| 5,505,525 A | 4/1996 | Denton |
| 5,664,846 A * | 9/1997 | Kuck ...................... 301/108.1 |
| 5,752,746 A | 5/1998 | Perry |
| 5,785,390 A | 7/1998 | Gold et al. |
| 5,860,708 A | 1/1999 | Borders et al. |
| 6,273,519 B1 | 8/2001 | Tsou |
| 6,546,892 B2 | 4/2003 | Kelly, Jr. et al. |
| 6,676,227 B1 * | 1/2004 | Stanczak ................. 301/108.1 |
| 6,783,191 B1 * | 8/2004 | Slesinski et al. ......... 301/108.1 |

* cited by examiner

Primary Examiner—Russell D. Stormer
Assistant Examiner—Jason R. Bellinger
(74) Attorney, Agent, or Firm—Vedder Price Kaufman & Kammholz

(57) ABSTRACT

A hub cap vent plug which is resistant to penetration by water sprayed under high pressure during vehicle washing. The plug includes an axially outer end face portion, sidewall portions adapted to mate in fluid-tight relation with an opening in an associated hub cap, and a small diameter opening terminating at one of its ends in a thin web of the plug material. The plug has a valve cover with an inner surface spaced closely apart from said end face portion, thereby defining a pair of transverse openings. A normally closed valve such as a slit in the web allows pressure and vacuum to vent through the valve.

10 Claims, 3 Drawing Sheets

VENTING PLUG FOR VEHICLE HUB CAP

The present invention relates to a venting plug for use with a tractor, semi-trailer, full trailer or like hub cap, and more particularly, to a construction which includes a two-way valve which can relieve pressure from inside the hub, or, when necessary, can relieve a vacuum or negative pressure within the hub but will not admit water, including a high pressure spray of water. Various hub caps having valves have been proposed for this purpose, but the most effective overall valve is one in the present invention wherein a pair of leaflets formed integrally with the material from which the plug is made are kept together but separated by a small slit, which is responsive to moderate amounts of pressure and is inherently self-sealing. However, such forms of vents alone in the end face of a plug have encountered several drawbacks.

The first drawback is the lack of means to protect the seal, especially in view of increasing use of high pressure washers by truck maintenance workers. These high pressure washers, which spray water in a relatively large volume, have penetrated the hub cap valves and, thus allowed water to enter the hub of a truck. Needless to say, this is not desired, and can compromise the lubrication characteristics of the hub interior, whether it be grease or an oil reservoir type of hub cavity.

Several attempts have been made to cure this problem, but they either involve a large overcap, which makes the venting problematic, or involve mechanical valves which add complexity and which may be compromised in use by the effects of moisture on them.

The present invention utilizes an extremely simple but effective shroud or cover for a two-way valve, without in any way compromising the ability of the valve to vent or relieve vacuum. The shroud of the invention is made integral with the plug and with such design that it will deflect direct or and most angled water spray from high pressure washers. As the angle of incidence of the water spray is reduced from the vertical or near vertical until it reaches an almost parallel to the face angle, at which it will pass through the shroud but not penetrate the valve. Yet this construction allows the pressure spray to clean areas even very close to the valve effectively.

The hub cap plug of the invention is the ultimate in simplicity and low cost, and has no separate moving parts.

Accordingly, it is an object of the present invention to provide a novel hub cap plug which will maintain a hub in a completely water-tight relation, but which can be washed under pressure without fear of compromising the integrity of the seal.

Another object is to provide an simple and economical way of guarding the interior of the hub against the force of entry of water by a pressurized washer or the like.

It is still further object of the invention is to provide a plug which can be simply interchanged with existing plugs and which adds the advantages of being waterproof even when exposed to high pressure washers.

A still further object of the invention is to provide a simple and economical, water tight plug which will permit unimpeded two-way valve action.

A still further object of the invention is to provide a plug which may be used in a variety of openings in the hub cap and may be adapted for these various openings without compromising the function or operation of the valves and valve cover or shroud.

The invention achieves its objects and other inherent objects and advantages thereof by providing a hub cap vent plug including an axially outer end face portion, side wall portions adapted to meet in fluid tight relation with an opening in an associated hub cap, a small diameter opening terminating at one end in access to the interior of the hub cavity and at its other end in a thin web of material from which the plug is made. The vent plug also includes a valve cover having at least one transverse opening therein, with the valve cover being spaced slightly apart from the web, and a normally closed valve such as a a slit in the web to allow pressure and vacuum to vent through the valve. Penetration of pressurized water through the valve is resisted by deflecting any pressurized water aimed directly at the vent plug.

The manner in which these and other objects of the present invention are achieved in practice will become more clearly apparent when reference is made to the following detailed description of the invention and shown in the accompanying drawings wherein like reference numbers indicate corresponding parts throughout.

DESCRIPTION OF THE PREFERRED EMBODIMENTS OF THE INVENTION

Although the invention may be embodied in various forms, particularly in the shape of the exterior surfaces thereof, a description of one preferred embodiment of the invention will be shown in detail.

Figure 1:
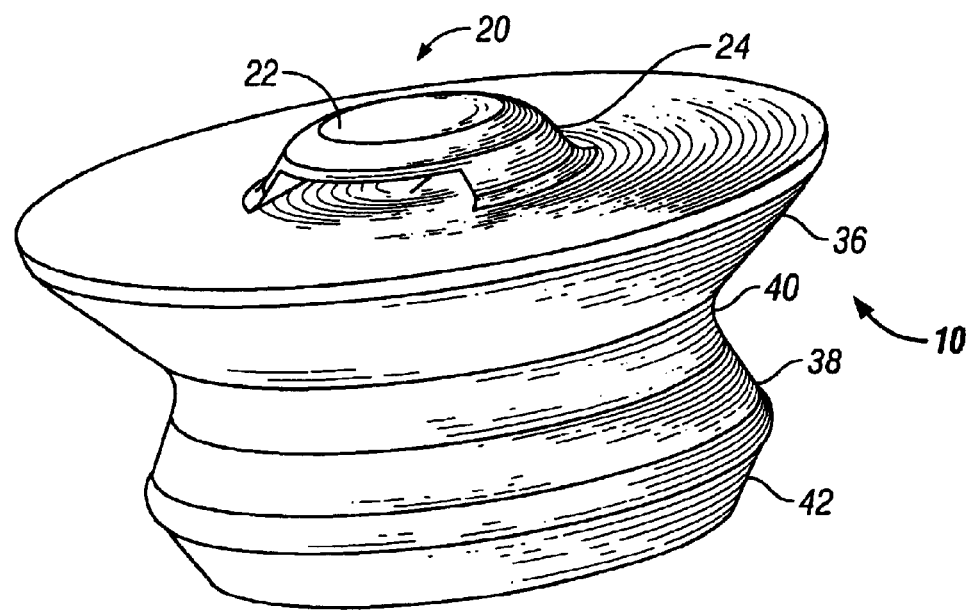
FIG. 1 is a perspective view of the hub cap plug with a two-way vent or valve and a shroud or cover made according to the invention.
Figure 3:
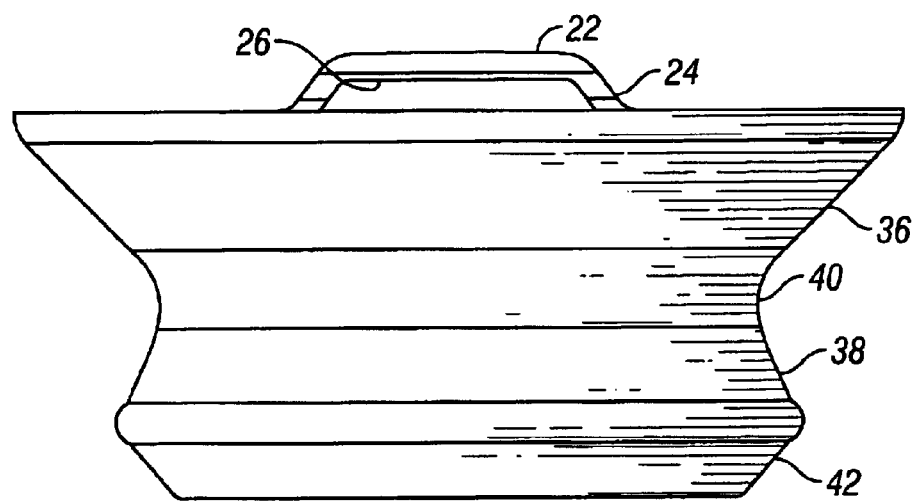
FIG. 3 is a side elevational view of the hub cap venting plug of the invention of FIG. 1.
Figure 2:
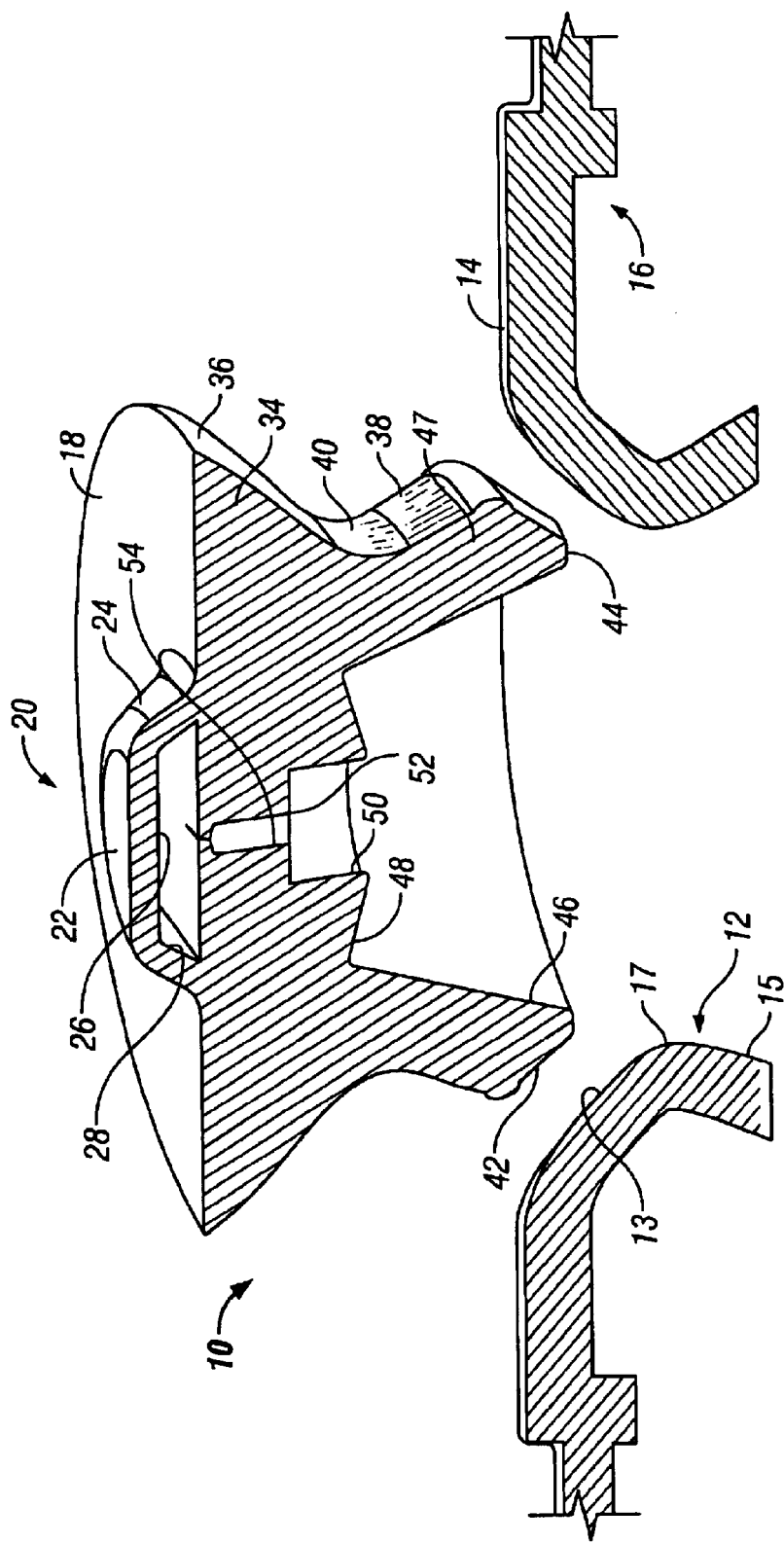
FIG. 2 is an exploded view showing the hub cap vent plug separated from a position of use within an opening in a truck hub cap.

Referring now to FIGS. 1 and 2 in greater detail, the invention is shown to include a hub cap plug, generally designated 10 which is adapted to be received in an opening 12 in the end face 14 of the hubcap generally designated 16. This opening 12 is defined in this embodiment of the invention by a first inclined surface 13 which tapers to a smaller diameter as it extends axially inwardly, and a second inclined surface 15 which tapers to a larger diameter as it extends axially inwardly. Thus, the smallest diameter portion of the opening 12 is at the point of the sidewall 17 where the two inclined surfaces 13, 15 meet.

Figure 4:
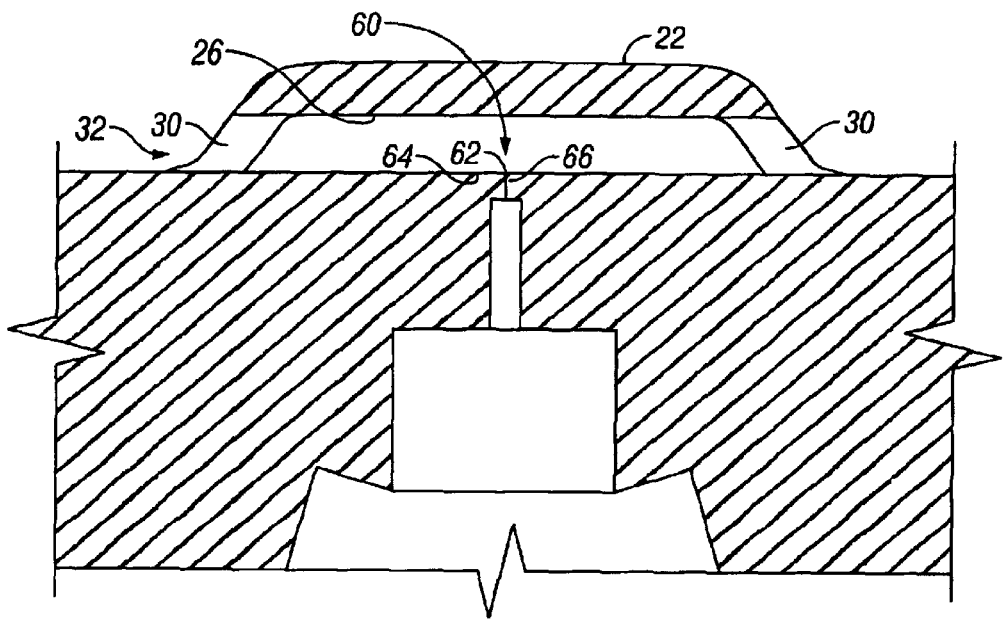
FIG. 4 is a fragmentary view showing the leaflets comprising the valve in the closed position and the passages to it from inside the hub cap, and also showing the passage through the shroud or cover therefor.
Figure 5:
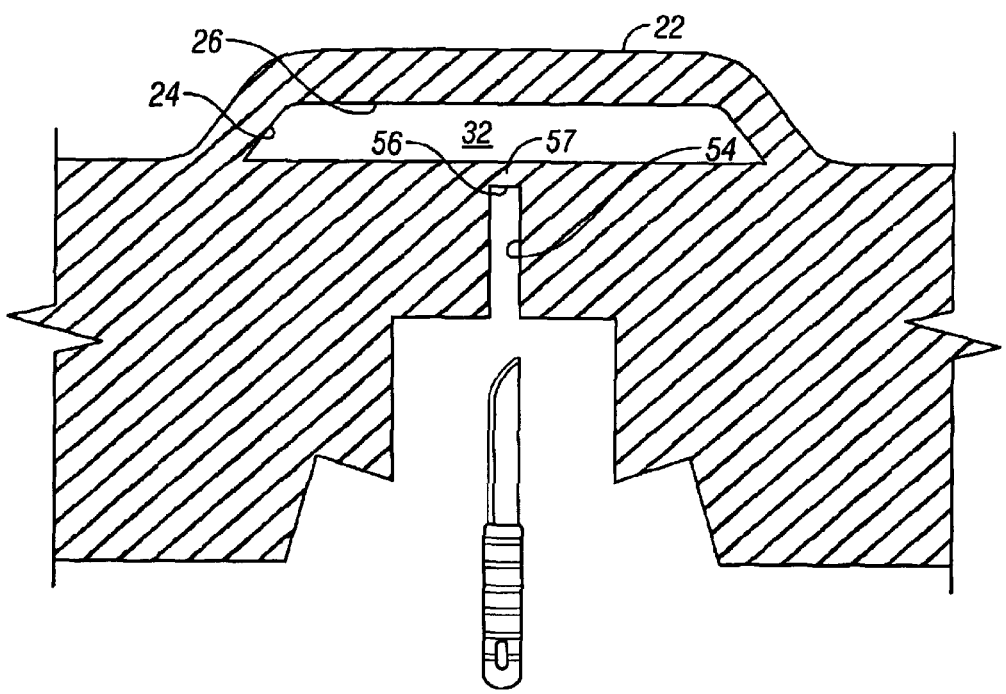
FIG. 5 is a view similar to FIG. 4, but taken 90° from the view of FIG. 4 and showing the plug just before it is pierced by a knife (shown schematically) to form the valve leaflets.

The plug 10 includes a number of components, including a generally flat, axially outer end face portion 18. The expression "axially outer" or "axially inner" relate to the position of the hub cap plug in use within the hub cap of a vehicle. There is a shroud or cover for a vent, such shroud being generally designated 20, and this cover or shroud includes an outer end face 22, inclined sidewalls 24, an interior generally flat surface 26, an interior inclined surface 28, and shroud openings 30 (FIG. 4). These surfaces 22, 24, 26, 28 define an interior transverse passage generally designated 32, to which reference may be made later.

Referring now to the body 34 generally designated of the hub cap vent plug 10, this body 34 is shown to include an inwardly tapering axially outer surface 36, and an outwardly tapering axially inner surface 38, and a generally rounded reduced diameter center surface 40. Inasmuch as the plug 10 is designed to be inserted within the opening 12, simply by applying an axially directed force, the plug body includes an axially innermost tapered guide surface 42, and an axially inner end face surface 44. In the preferred form, this body also includes a frusto-conical re-entrant surface 46 which will provide flexibility of the skirt generally designated 47 formed by these surfaces.

There is also in this preferred form, a transition surface 48 and intermediate generally cylindrical surface 50. The surface 50 terminates in an end face surface 52, the inner most portion of which enters a smallest diameter cylindrical surface 54. This cylindrical surface 54 terminates at one end at the end face surface 52 and at its other end, at an axially outermost surface 56. The cylindrical surface 54 terminates in a web 57 of material which is relatively thin and is made from the same material of which is the body 34 is made. The web has formed in it a two-way valve generally designated 60 in the form of a slit 62, thus providing a left and right hand, normally closed leaflets or portions 64, 66. These leaflets 64, 66 are able to be displaced to permit venting of any pressure which may build up inside the truck hub. Likewise, on the occasion of the truck hub cooling off, the valve may also operate in the reverse direction and permit air to enter the hub from the outside.

In use, the leaflets 64, 66 are shrouded or protected from direct blasts of pressurized water that would otherwise be directed against them when the washer is used to clean the truck, particularly the wheels, chassis, and the like of both tractor, semi-trailer or full trailer.

Directing a blast of pressurized water cannot be done either directly or at any rather severe angle, although, as the angle approaches zero with respect to the end wall of the plug, the pressurized water is no longer being directed perpendicular to or towards the interior of the hub, but is directed substantially parallel to the end face. Therefore, there is no need to prevent this water from entering the hub. However, the transverse passage 32 nevertheless always remains open so that it may vent whatever pressure is inside the hub at any time.

The exterior shape and dimensions of the plug are relatively unimportant. First, the end face 10 is shown as being substantially planar, but this may have a domed, concave, corrugated, or other shape, as desired. Inclined sidewalls 36, 38 have been illustrated, but these may be straight, with our without ribs or the like, or they may have threads to facilitate a screw-in mechanism. They also may include O-rings or other gasketing material, if desired.

The interior frusto-conical re-entrant surface 46 may be cylindrical or tapered. In the case of the screw-in type plug, one may have external gaskets, or, dependent on the material used, a gasket or seal may not be required at all. The same may be said for the intermediate cylindrical surface, although this is the preferred construction.

The smallest diameter cylindrical or slightly tapered surface 54 is required, and its termination in the web of material providing the leaflets is essential so the leaflets and the slit may be of a length sufficient to impart relative rigidity to the leaflets. Of course, this surface could be tapered or otherwise modified.

The opening in the hub cap, for reasons of dynamic balance and for other reasons as well, is normally at the center of the hub cap. However, it is not strictly necessary that it be located in this area, since some devices are inserted within the sidewall of a hubcap or the like.

The material from which the center vent plug of the present invention is preferably made comprises a thermoplastic elastomer. Preferably, a fully cross-linked ethylene-propylene dimer/pp thermo-plastic vulcanizate is preferred over thermo-set elastomers such as polychloroprene-EPDM. The advantage in using the thermo-plastic vulcanizate is that the processing time is materially reduced. However, the present invention does not depend for its advantages in the use of any particular material.

It will thus be seen that the present invention provides a novel and effective way to do away with the risk of pressure washing in vehicles, and that the invention has a number of advantages and characteristics including those pointed out herein, and others which are inherent in the invention.

What is claimed is:

1. A hub cap vent plug which is resistant to penetration by water sprayed under high pressure during vehicle washing, said plug comprising an axially outer end face portion, sidewall portions adapted to mate in fluid-tight relation with an opening in an associated hub cap, a small diameter opening terminating at one of its ends in a thin web of the material from which said plug is made, a valve cover having an inner surface substantially parallel to said end face portion and spaced closely axially apart from said end face portion, so as to define at least one transverse opening between said axially outer end face portion and said valve cover, said inner surface being of smaller diameter than said axially outer end face portion, and a normally closed valve comprising a slit in said thin web of material to allow pressure and vacuum to vent through said valve, said valve cover thereby resisting penetration through said valve by pressurized water.

2. A hub cap vent plug as defined in claim 1 which includes an enlarged diameter opening communicating with the interior of said opening in said associated hub cap at one end of said opening and with said small diameter opening at the other end.

3. A hub cap vent plug as defined in claim 1 which further includes a stepped passage having at least a first enlarged diameter opening and a second reduced diameter opening communicating with the interior of said hub at one end and with said small diameter opening at the other end of said passage.

4. A hub cap vent plug as defined in claim 1 which includes a radially outer surface portion having axially inner and outer tapered surfaces with a reduced diameter portion therebetween, said tapered surfaces being adapted to mate with an opening in said hub cap in fluid tight relation.

5. A hub cap vent plug as defined in claim 1 wherein said plug is made from an elastomer.

6. A hub cap vent plug as defined in claim 1 wherein said plug is made from an elastomeric material comprising natural or synthetic rubber.

7. A hub cap vent plug as defined in claim 1 wherein said elastomeric material is a thermoplastic rubber.

8. A hub cap vent plug as defined in claim 1 wherein said at least one transverse opening comprises two transverse openings.

9. A hub cap vent plug as defined in claim 1 wherein said valve cover has a diameter about one-half to one-quarter of the diameter of said axially outer end face portion of said vent plug.

10. A hub cap vent plug which is resistant to penetration by water sprayed under high pressure during vehicle washing, said vent plug comprising an elastomeric main body portion including an axially outer end face portion, an axially inner annular surface portion, first and second radially outer tapered sidewall sections meeting at a reduced diameter portion adapted to fit snugly into a center opening in said hub cap, a cylindrical re-entrant portion lying adjacent said axially inner annular surface portion at one of its ends and terminating at an annular transition surface at the other end, and a reduced diameter cylindrical portion being open at one end and being closed off at the other end by a thin web of elastomer, said web having a normally closed valve in the form of two leaflets separated by a slit, thereby permitting air to vent to and from the interior of said hub, said valve being covered by a shroud that is smaller in diameter than said axially outer end face portion of said plug, said shroud having at least one open passage therethrough, whereby said shroud will deflect pressurized water away from said valve and said open passage will permit water to pass therethrough.

* * * * *